United States Patent
Strelow et al.

(10) Patent No.: US 9,263,867 B2
(45) Date of Patent: Feb. 16, 2016

(54) CLAMP RING, CABLE SCREW CONNECTION AND METHOD FOR ASSEMBLING A CABLE SCREW CONNECTION

(75) Inventors: Markus Strelow, Moerlenbach (DE); Andreas Leonhard, Darmstadt (DE)

(73) Assignee: TE CONNECTIVITY GERMANY GMBH, Bensheim (DE)

( * ) Notice: Subject to any disclaimer, the term of this patent is extended or adjusted under 35 U.S.C. 154(b) by 428 days.

(21) Appl. No.: 13/335,294

(22) Filed: Dec. 22, 2011

(65) Prior Publication Data

US 2012/0159740 A1   Jun. 28, 2012

(30) Foreign Application Priority Data

Dec. 23, 2010   (DE) .......................... 10 2010 064 071

(51) Int. Cl.
| | |
|---|---|
| H05K 1/00 | (2006.01) |
| H02G 3/06 | (2006.01) |
| H01R 13/52 | (2006.01) |
| H01R 13/59 | (2006.01) |

(52) U.S. Cl.
CPC .......... *H02G 3/0658* (2013.01); *H01R 13/5205* (2013.01); *H01R 13/59* (2013.01); *Y10T 16/05* (2015.01); *Y10T 16/063* (2015.01); *Y10T 29/49879* (2015.01)

(58) Field of Classification Search
CPC ........................... H02G 15/013; H02G 15/007
USPC ...... 174/254, 68.3, 99 R, 250, 251, 268, 653, 174/665; 74/502.4, 502.6; 285/154.4; 439/279; 361/679.01, 679.02
See application file for complete search history.

(56) References Cited

U.S. PATENT DOCUMENTS

| | | | |
|---|---|---|---|
| 1,699,690 A | | 1/1929 | Dake |
| 7,097,490 B2 * | | 8/2006 | Eaton et al. ................... 439/350 |

FOREIGN PATENT DOCUMENTS

| | | |
|---|---|---|
| DE | 4225263 C1 | 2/1994 |
| DE | 19643962 A1 | 5/1998 |
| EP | 0 093 524 A2 | 11/1983 |
| EP | 0 750 376 A2 | 12/1996 |
| EP | 1983629 A1 | 10/2008 |
| GB | 430 356 A | 6/1935 |

OTHER PUBLICATIONS

Search Report issued by the German Patent and Trademark Office, dated Jul. 11, 2011, for Priority Application No. DE102010064071.9; 6 pages.

European Search Report issued by the European Patent Office, Berlin, dated Sep. 13, 2013, for European Application No. EP 11 18 8074; 2 pages.

* cited by examiner

*Primary Examiner* — Tremesha S Willis

(74) *Attorney, Agent, or Firm* — Faegre Baker Daniels LLP

(57) ABSTRACT

A clamping ring for a cable gland has a first ring and a second ring, the first ring and the second ring being orientated coaxially relative to a common longitudinal axis. The first ring and the second ring are connected via a plurality of deformable ribs. The ribs are designed to deform in the direction of the longitudinal axis when the first ring and the second ring are brought into convergence one with the other.

5 Claims, 3 Drawing Sheets

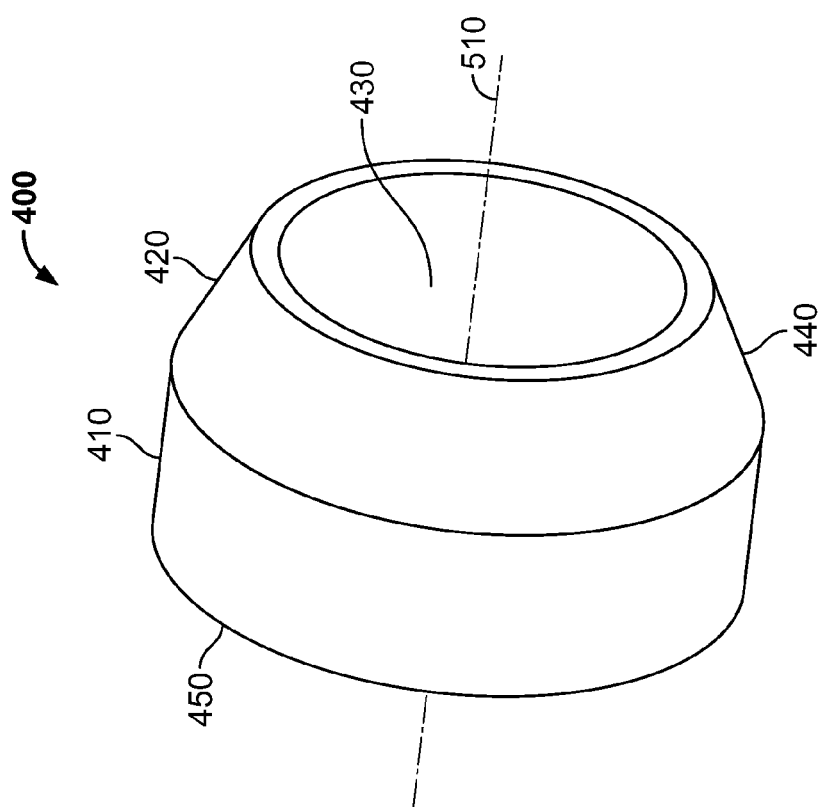
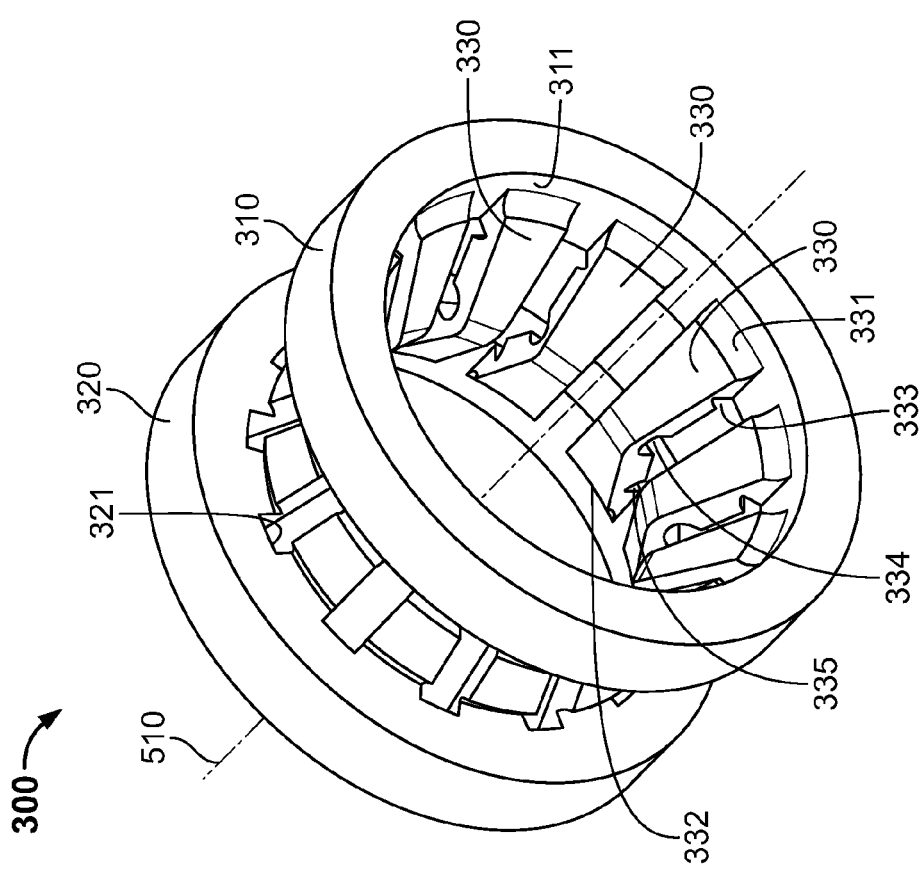
Fig. 4
Fig. 3

CLAMP RING, CABLE SCREW CONNECTION AND METHOD FOR ASSEMBLING A CABLE SCREW CONNECTION

BACKGROUND

The invention relates to a clamping ring for a cable gland and to a method of fitting a cable gland.

Cable glands are known from the prior art, and serve to fix electrically conductive cables to electrical plug connectors or to cable bushings in order to prevent any inadvertent separation of the cable from the plug connector or the cable bushing. Cable glands that serve simultaneously to seal a region between the cable and the plug connector or the cable bushing are also known.

Conventional cable glands are generally screwed onto the plug connector or the cable bushing far enough that a defined torque arises. This has the disadvantage that any check undertaken for correct fitting will be laborious, and require special tools. It has also proved to be the case that, after a certain storage period, an undefined loosening torque arises. In some circumstances, this can lead to the cable gland working loose.

It is therefore the object of the present invention to provide an improved clamping ring for a cable gland. This object is achieved by a clamping ring with the features of claim 1. It is a further object of the present invention to provide an improved cable gland. This object is achieved by a cable gland with the features of claim 5. It is a further object of the present invention to provide an improved method of fitting a cable gland. This object is achieved by a method with the features of claim 11. Preferred developments are described in the dependent claims.

SUMMARY

A clamping ring according to the invention for a cable gland has a first ring and a second ring, the first ring and the second ring being orientated coaxially relative to a common longitudinal axis. In this case, the first ring and the second ring are connected via a plurality of deformable ribs, which are designed to deform in the direction of the longitudinal axis when the first ring and the second ring are brought into convergence one with the other. This clamping ring can advantageously serve for the fixing of a cable in a cable gland. It is particularly advantageous that the clamping ring can simultaneously deform a seal of a cable gland into a sealing position.

In one embodiment of the clamping ring, each rib has a first end and a second end, wherein each first end is disposed on a first internal circumferential surface of the first ring, and each second end is disposed on a second internal circumferential surface of the second ring. Movement of the rings towards one another then advantageously leads to a deformation of the ribs, which can be used to fix a cable.

The clamping ring is preferably formed in one piece. The clamping ring can then advantageously be manufactured cost-effectively.

It is also preferred for the clamping ring to be composed of a plastics material. The clamping ring can then advantageously be manufactured by, for example, an injection-moulding process.

A cable gland according to the invention consists of a nut and a clamping ring. In this case, the nut has an internal thread and a feed-through opening which forms a cable socket. The clamping ring can be disposed in the nut. The clamping ring is further designed to deform itself into the cable-receiving region when the nut is screwed onto an external thread of a counterpart. This cable gland can then advantageously serve to fix a cable on the counterpart. It is also advantageous that the cable is fixed automatically during the screwing of the nut onto the counterpart.

The clamping ring of the cable gland is preferably constructed according to one of the above-mentioned embodiments. A clamping ring configuration of this kind has advantageously proved extremely effective.

In a development of the cable gland, the cable gland includes a seal, which is designed to seal a region between a cable and the counterpart when the cable is disposed in the cable-receiving region of the nut, and the nut has been screwed onto the counterpart. The cable gland can then advantageously serve not just to fix the cable, but also to seal a region between the cable and the counterpart.

It is particularly expedient that the clamping ring is designed to deform a portion of the seal into the cable-receiving region when the nut is screwed onto the counterpart. The sealing then also advantageously occurs automatically during the operation of screwing the nut onto the counterpart.

In one embodiment of the cable gland, the seal has a cylindrical portion and a conical portion which is disposed on a top surface of the cylindrical portion, the seal further having an opening, which runs through the cylindrical portion and the conical portion. The clamping ring of the cable gland can then advantageously deform the conical portion of the seal into the cable-receiving region of the nut in order to seal the region between the cable and the counterpart.

The counterpart is preferably a plug connector or a housing bushing. The cable gland is advantageously suitable for use with diverse counterparts.

A method according to the invention of fitting a cable gland comprises steps for disposing a seal in a recess of a counterpart, disposing a clamping ring in a nut of the cable gland, partially screwing the nut onto the counterpart, introducing a cable into a feed-through opening in the nut, and screwing the nut onto the counterpart as far as it will go. The fitting process is advantageously facilitated by the fact that the nut is already partially screwed onto the counterpart before the cable is introduced into the feed-through opening in the nut. This prevents either the seal or the clamping ring moving from its intended position during the introduction of the cable. One further advantage of the method according to the invention lies in the fact that the nut is screwed onto the counterpart until it can go no further, i.e. until a dead stop is reached. This facilitates the automation of the fitting method and also simplifies any subsequent checking as to whether fitting has been successfully accomplished.

It is especially preferred that, as the nut is screwed on, the cable is fixed in the nut by the clamping ring and a region between the cable and the counterpart is sealed by the seal. The fixing of the cable and the sealing then advantageously occur automatically and require no additional method steps.

BRIEF DESCRIPTION OF THE DRAWINGS

The invention is described in greater detail below with reference to drawings, in which:

FIG. 3 is a perspective view of a clamping ring; and

FIG. 4 is a perspective view of a seal.

DETAILED DESCRIPTION OF THE EMBODIMENTS

Figure 1:
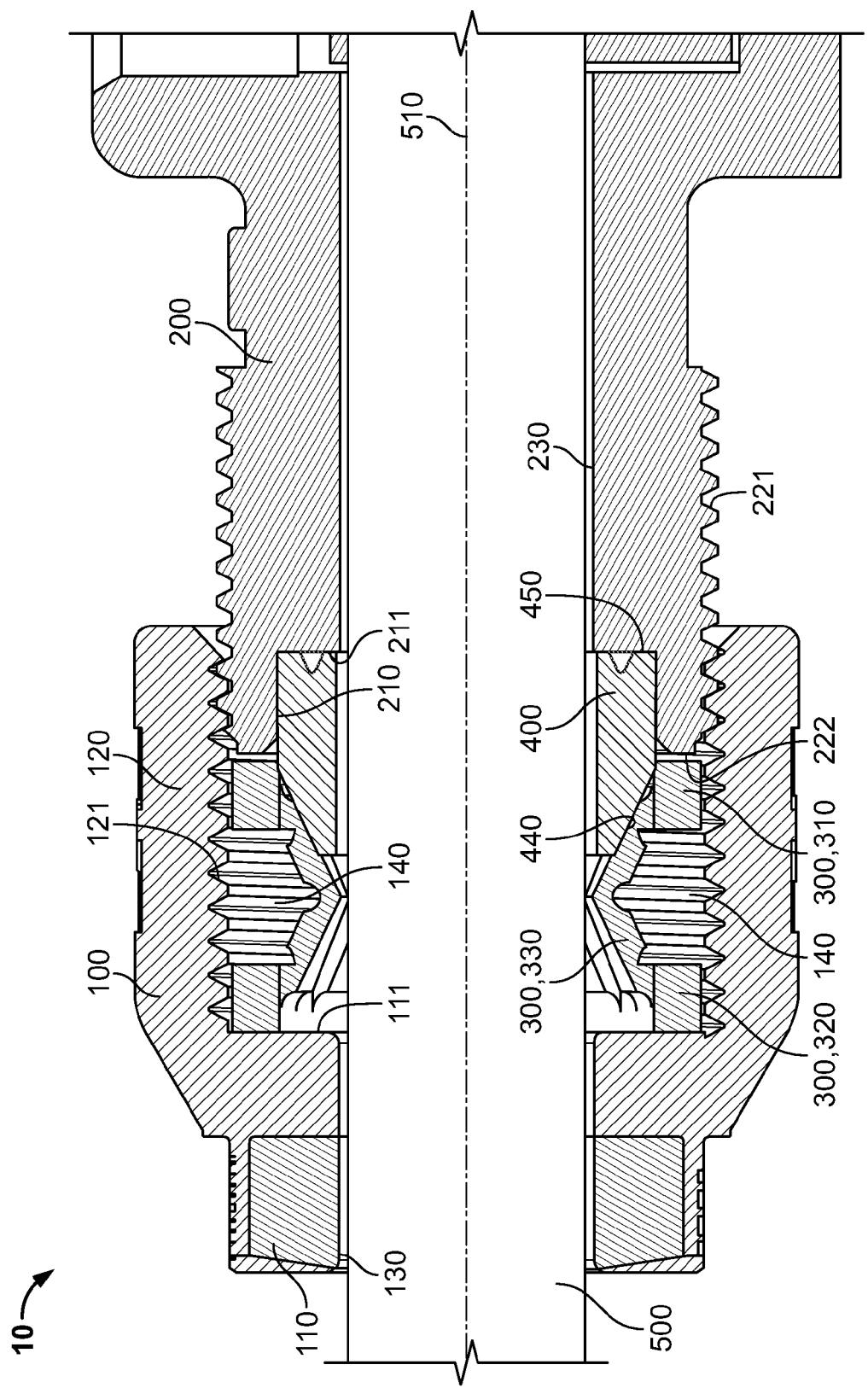
FIG. 1 is a section through a cable gland partially screwed onto a counterpart.

FIG. 1 shows, in a slightly schematic representation, a section through a cable gland 10, which is partially screwed onto a counterpart 200. The counterpart 200 may be, for example, a plug, a socket, a cable bushing in a housing or a different counterpart. The cable gland 10 serves to fix to the counterpart 200 a cable 500 fed to the counterpart 200, in order to prevent any inadvertent loosening of the cable 500 from the counterpart 200. The cable gland 10 further serves to seal the counterpart 200.

The cable gland 10 comprises a nut 100, a clamping ring 300 and a seal 400. The nut 100, the clamping ring 300, the seal 400 and the counterpart 200 are, respectively, substantially rotationally symmetrical, and in FIG. 1 they are bisected at a plane extending through a common longitudinal axis 510, which forms an axis of symmetry.

The nut 100 has a guidance portion 110 and a threaded portion 120. Extending along the longitudinal axis 510 through the guidance portion 110 and the threaded portion 120 of the nut 100 is a first feed-through opening 130, the diameter of which in the guidance portion 110 is selected to be slightly greater than the diameter of the cable 500.

In the threaded portion 120 of the nut 100, the first feed-through opening 130 is widened relative to the guidance portion 110. In the threaded portion 120, the first feed-through opening 130 has an internal thread 121. In the transition region between the threaded portion 120 and the guidance portion 110 of the nut 100, the first feed-through opening 130 narrows so that an annular, first internal contact surface 111 is formed there in an orientation perpendicular to the longitudinal axis 510.

The counterpart 200 has a substantially hollow-cylindrical basic shape, orientated in parallel with the longitudinal axis 510, with a second feed-through opening 230 orientated in parallel with the longitudinal axis 510. The diameter of the second feed-through opening 230 is selected to be slightly greater than the diameter of the cable 500.

In an end-face region of the counterpart 200 facing towards the nut 100, the second feed-through opening 230 widens and forms there a recess 210. Formed in the transition region between the recess 210 and the remaining portions of the second feed-through opening 230 is an annular, second internal contact surface 211, orientated perpendicular to the longitudinal axis 510.

On the end face facing the nut 100, the counterpart 200 has an annular end-face contact surface 222 which is orientated perpendicular to the longitudinal axis 510 and extends between the recess 210 and the external lateral surface of the substantially hollow-cylindrical counterpart 200.

On its external lateral surface, the counterpart 200 is provided with an external thread 221, the thread dimensions of which are matched to the internal thread 121 of the nut 100.

The counterpart 200 may be, for example, a cable bushing in a housing. The counterpart 200 may, however, also be an electrical plug connector, e.g. an electrical plug or an electrical socket. In this case, one or more electrical contact elements, not shown in FIG. 1, are disposed in the counterpart 200 and connected in an electrically conductive manner to electrically conductive strands of the cable 500.

In the drawing in FIG. 1, the nut 100 is only partially screwed onto the external thread 221 of the counterpart 200. A void 140 thus exists between the cable 500, the first internal contact surface 111 of the guidance portion 110 of the nut 100, the internal thread 121 in the threaded portion 120 of the nut 100, and the counterpart 200. Disposed in this void 140 are the clamping ring 300, described below by reference to FIG. 3, and the seal 400, described below by reference to FIG. 4.

FIG. 3 shows a perspective view of the clamping ring 300. The clamping ring 300 has a first ring 310 and a second ring 320. The first ring 310 and the second ring 320 are disposed coaxially relative to the common longitudinal axis 510. The first ring 310 and the second ring 320 respectively take the form of hollow cylinders that are short in the direction of the longitudinal axis 510. The dimension of the rings 310, 320 in the direction of extension of the longitudinal axis 510 is smaller than the respective internal diameters of the rings 310, 320 and roughly corresponds to the difference between the external diameters and the internal diameters of the rings 310, 320. The dimensions of the rings 310, 320 are preferably selected to be identical.

The first ring 310 and the second ring 320 of the clamping ring 300 are connected together by a plurality of ribs 330. For example, 13 ribs 330 may be provided. The ribs 330 are evenly distributed in the circumferential direction of the clamping ring 300.

Each of the ribs 330 has a first end portion 331 and a second end portion 332. Each first end portion 331 is disposed on a first internal circumferential surface 311 of the first ring 310. Each second end portion 332 is disposed on a second internal circumferential surface 321 of the second ring 320. The ribs 320 could, however, also be connected to the rings 310, 320 in a different manner.

Each rib 330 is slightly curved so that each rib 330 arches between its first end portion 331 and its second end portion 332 in the direction of the longitudinal axis 510. In addition, each rib 330 has, on its surface remote from the longitudinal axis 510, a first notch 333, a second notch 334 and a third notch 335. Each of the notches 333, 334, 335 is orientated perpendicular to the longitudinal axis 510, and thus also perpendicular to the direction of the longitudinal extension of each rib 330.

If the first ring 310 and the second ring 320 of the clamping ring 300 are brought into convergence with one another, the notches 333, 334, 335 allow the ribs 330 to deform in the direction of the longitudinal axis 510. In this process, the first notches 333 and the third notches 335 of all the ribs 330 are opened further, whilst the second notches 334 of all ribs 330 are closed. Owing to this deformation of the ribs 330, a centre region of each rib 330 located between the first end portion 331 and the second end portion 332 moves closer to the longitudinal axis 510. In this manner, the convergence of the first ring 310 with the second ring 320 brings about a narrowing of the internal diameter of the clamping ring 300.

The clamping ring 300 is preferably formed in one piece and preferably comprises a plastics material. The clamping ring 300 may, for example, be produced by an injection-moulding process.

FIG. 4 shows a perspective view of the seal 400. The seal 400 has a cylindrical portion 410 and a conical portion 420. The conical portion 420 is disposed on a top surface of the cylindrical portion 410.

A cylindrical opening 430 extends through the cylindrical portion 410 and the conical portion 420 along the common longitudinal axis 510 of the cylindrical portion 410 and the conical portion 420. The diameter of the cylindrical opening 430 is selected to be slightly greater than the diameter of the cable 500.

The lateral surface of the conical portion 420 forms a conical external surface 440. The top surface of the cylindrical portion 410 that is remote from the conical portion 420 forms an annular rear surface 450.

The seal 400 is preferably composed of a resilient material, e.g. a plastics material.

FIG. 1 shows the arrangement of the clamping ring 300 and the seal 400 in the nut 100 of the cable gland 10. The clamping ring 300 is disposed in the nut 100 in such a way that the first ring 310 of the clamping ring 300 contacts the end-face contact surface 222 of the counterpart 200 and the internal thread 121 of the nut 100. The second ring 320 of the clamping ring 300 contacts the first internal contact surface 111 of the nut 100 and the internal thread 121 of the nut 100. In the situation shown in FIG. 1, in which the nut 100 is only partially screwed onto the counterpart 200, the clamping ring 300 is not deformed. The internal diameter of the clamping ring 300, defined by the ribs 330 of the clamping ring 300, is slightly greater than the diameter of the cable 500.

The seal 400 is disposed in the region between the nut 100, the counterpart 200 and the cable 500 in such a way that the cylindrical portion 410 of the seal 400 is located substantially in the recess 210 of the counterpart 200. In this case, the rear surface 450 of the seal 400 contacts the second internal contact surface 211 of the counterpart 200. The conical portion 420 of the seal 400 extends in the direction of the clamping ring 300. The ribs 330 of the clamping ring 300 contact the conical external surface 440 of the conical portion 420 of the seal 400.

In the situation depicted in FIG. 1, the cable 500 can be introduced into the first feed-through opening 130 of the nut 100 and the second feed-through opening 230 of the counterpart 200, or can be withdrawn from the second feed-through opening 230 of the counterpart 200 and the first feed-through opening 130 of the nut 100. If the cable 500 is inserted as desired into the feed-through openings 130, 230, the nut 100 can be fully screwed onto the counterpart 200 in order to fix the cable 500 in its position and to seal a region between the cable 500 and the counterpart 200.

Figure 2:
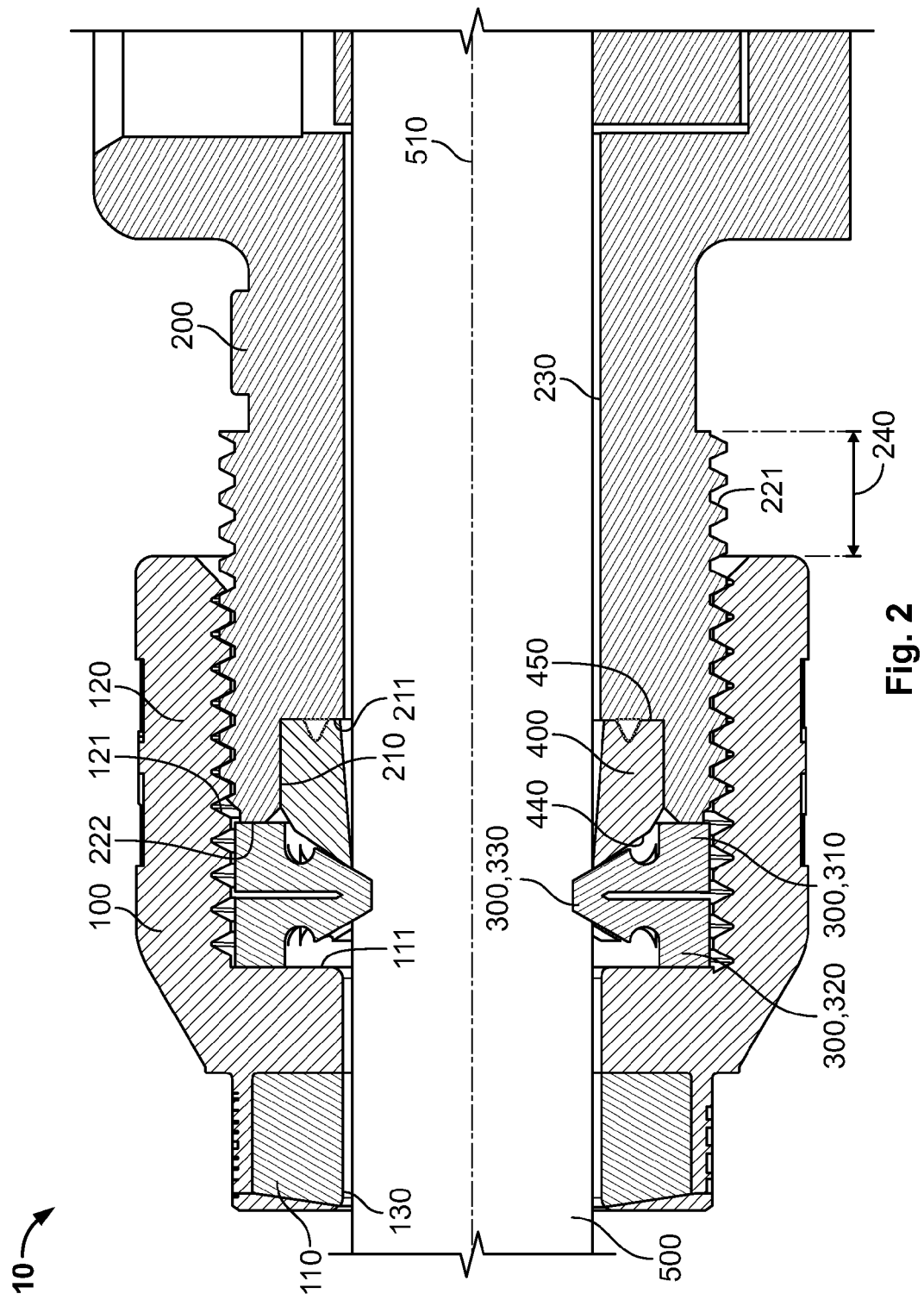
FIG. 2 is a section through the cable gland fully screwed onto the counterpart.

FIG. 2 shows a sectional view of the cable gland 10 and the counterpart 200 in the fitted state. Screwing the nut 100 fully onto the counterpart 200 has brought the first internal contact surface 111 of the nut 100 into convergence with the end-face contact surface 222 of the counterpart 200. Consequently, the second ring 320 of the clamping ring 300 has also been brought into convergence with the first ring 310 of the clamping ring 300. Owing to the convergence of the rings 310, 320 of the clamping ring 300, the ribs 330 of the clamping ring 300 have been deformed in such a way that the internal diameter of the clamping ring 300 has narrowed. A central region of each rib 330 of the clamping ring 300 has moved in the direction of the longitudinal axis 510 into the space filled by the cable 500, and is now in pressure contact with the cable 500. It is also possible that the central regions of the ribs 330 have partially entered into the sheath of the cable 500. Owing to the pressure contact between the ribs 330 of the clamping ring 300 and the cable 500, the cable 500 is, in the situation depicted in FIG. 2, secured against displacement in the longitudinal direction. The cable 500 is thus fixed by the cable gland 10.

The convergence of the first internal contact surface 111 of the nut 100 with the end-face contact surface 222 of the counterpart 200 and the resulting deformation of the ribs 330 of the clamping ring 300 has also given rise to a force exerted in the direction of the longitudinal axis 510 on the conical external surface 440 of the seal 400 that is in contact with the ribs 330. Consequently, the conical portion 420 of the seal 400 has been deformed in such a way that the diameter of the opening 430 in the seal 400 has decreased in the conical portion 420. The conical portion 420 of the seal 400 is pressed by the ribs 330 of the clamping ring 300 against the external circumference of the cable 500. In the region of the cylindrical portion 410 of the seal 400, however, the seal 400 continues to contact the counterpart 200. Thus, in the situation depicted in FIG. 2, the seal 400 seals the region that surrounds the cable 500 and is located between the cable 500 and the counterpart 200. As a consequence of this sealing, moisture or dust from the environment is prevented from passing along the cable 500 through the nut 100 and the counterpart 200 into the interior of the counterpart 200.

The presence of the seal 400 is immaterial for the operation of the clamping ring 300 of the cable gland 10. In a simplified embodiment of the cable gland 10, the seal 400 may therefore be dispensed with.

In the situation depicted in FIG. 2, the nut 100 is screwed onto the counterpart 200 as far as it will go. The stopping point is defined by, for example, the fact that the first ring 310 of the clamping ring 300 comes into contact with the second ring 320 of the clamping ring 300.

Since the nut 100 is screwed onto the counterpart 200 as far as it will go, or until a dead stop is reached, the desired final position of the nut 100 on the counterpart 200 is known. This enables a simple check to be carried out as to whether the nut 100 is in fact located at the desired final position on the counterpart 200 and thus that fitting has been successfully accomplished. To this end, checking dimensions 240 may, for example, be defined as the length of a portion of the external thread 221 of the counterpart 200 protruding beyond the nut 100 in the direction of the longitudinal axis 510. Verification of the checking dimensions 240 and comparison of the established checking dimensions 240 with desired dimensions makes it possible to achieve rapid, automatable checking of the fitting position of the cable gland 10.

In a method of fitting the cable gland 10, the seal 400 is preferably firstly disposed in the recess 210 of the counterpart 200. The clamping ring 300 is then disposed in the region of the internal thread 121 of the nut 100. As the next step, the nut 100 is partially screwed onto the counterpart 200. In this process, the nut 100 is screwed on only so far that deformation of the clamping ring 300 does not yet take place. The cable 500 is then introduced into the first feed-through opening 130 in the nut 100 and the second feed-through opening 230 in the counterpart 200. When the cable has reached the desired position, the nut 100 is fully screwed onto the counterpart 200 as far as it will go. The above-described fixing of the cable 500 by the clamping ring 300 and the above-described sealing of the cable 500 by the seal 400 occur as a result.

The invention claimed is:

1. Cable gland with a nut and a clamping ring, the nut having an internal thread and a feed-through opening which forms a cable-receiving region, it being possible to dispose the clamping ring in the nut, wherein the clamping ring is designed to deform itself into the cable-receiving region when the nut is screwed onto an external thread of a counterpart; wherein the cable gland includes a seal, which is designed to seal a region between a cable and the counterpart when the cable is disposed in the cable-receiving region of the nut, and the nut has been screwed onto the counterpart; and wherein the clamping ring is designed to deform a portion of the seal into the cable-receiving region when the nut is screwed onto the counterpart.

2. Cable gland according to claim 1, wherein the clamping ring has a first ring and a second ring, the first ring and the second ring being orientated coaxially relative to a common longitudinal axis, the first ring and the second ring being connected via a plurality of deformable ribs, and the seal being in proximity to the clamping ring, the ribs being designed to deform in the direction of the longitudinal axis when the first ring and the second ring are brought into convergence one with the other, whereby the ribs are forced into the cable and also compressed into the seal.

3. Cable gland according to claim 1, wherein the seal has a cylindrical portion and a conical portion, which is disposed on a top surface of the cylindrical portion, the seal having an opening, which runs through the cylindrical portion and the conical portion.

4. Cable gland according to claim 1, wherein the counterpart is a plug connector or a housing bushing.

5. Method of fitting a cable gland, comprising the following steps: disposing a seal in a recess of a counterpart; disposing a clamping ring in a nut of the cable gland, the nut having a cable-receiving region; partially screwing the nut onto the counterpart; introducing a cable into a feed-through opening in the nut; screwing the nut onto the counterpart as far as it will go; and moving the clamping ring into clamping engagement with the cable and into sealing engagement with the seal, wherein the seal is designed to seal a region between the cable and the counterpart when the cable is disposed through the nut, and the nut has been screwed onto the counterpart; and wherein the clamping ring is designed to deform a portion of the seal into the cable-receiving region when the nut is screwed onto the counterpart.

\* \* \* \* \*